United States Patent Office 3,574,146
Patented Apr. 6, 1971

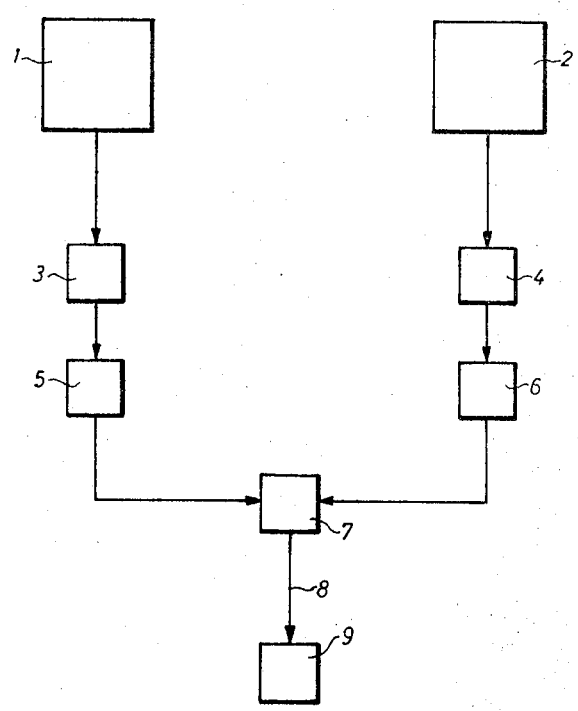

3,574,146
PROCESS FOR THE PRODUCTION OF
POLYAMIDE FOAMS
Hermann Schnell, Krefeld-Urdingen, Kurt Schneider, Krefeld-Bockum, and Heinrich Gilch, Krefeld-Urdingen, Germany, assignors to Farbenfabriken Bayer Aktiengesellschaft, Leverkusen, Germany
Filed Dec. 15, 1967, Ser. No. 690,833
Claims priority, application Germany, Dec. 17, 1966, F 50,985
Int. Cl. C08f 47/08; C08j 1/14, 1/20
U.S. Cl. 260—2.5    4 Claims

ABSTRACT OF THE DISCLOSURE

A process for the continuous production of a polyamide foam by introducing (1) a mixture of a lactam and an alkaline catalyst e.g. sodium borohydride, and (2) a mixture of a lactam and an activator, e.g. hexamethylene diisocyanate, in a mixing chamber. Preferably, heating is accomplished in the mixing chamber by heat exchange wherein mixture (1) is introduced just above the lactam melting point and mixture (2) is above the reaction temperature. The combined mixtures are introduced into a heated mold for polymerization and foaming.

---

This invention relates to a process for the continuous production of polyamide foams. It is already known that lactams can be converted into foam plastics by anionic polymerization activated by bases such as metallic sodium or sodium carpolactam, and acylating agents such as isocyanates or N-acetyl lactam compounds, together with blowing agents such as azides which liberate gas. Also formation of foam can be effected by passing nitrogen through the reaction mixture during polymerizing or by adding low boiling solvents to the reaction mixtures.

Polyamide foams can also be produced by adding a relatively high proportion of isocyanates to the lactams in addition to certain bases, so that the isocyanate acts both as activator in the ionic polymerization of the lactam and as blowing agent. Akali metal borohydrides and alkaline earth metal borohydrides have proved to be especially effective in this process since they themselves liberate gas and catalyse the decomposition of isocyanate. The reaction velocity is greatly increased by this catalyst system. If isocyanates are used both as activators and as blowing agents for polymerizing and foaming lactams, it is difficult to carry out the process on a large scale. It is difficult to lead off the heat of reaction owing to the low thermal conductivity of the foam. Severe local overheating, pitting and brown discolouration of the foam may therefore occur. Even when foaming is carried out in relatively small moulds, it is difficult to obtain uniform foams without agitation produced by stirring or other aids.

A process for the continuous production of polyamide foams by activated anionic polymerization of lactams having more than three ring members has now been found in which these disadvantages can be avoided, which comprises combining a heated melt of a mixture from a lactam and an alkaline catalyst with a heated melt of a mixture from said lactam and an activator in a mixing chamber, introducing the mixture in a preheated form and foaming said mixture.

The object of the invention is a process for the continuous production of polyamide foams which comprises melting separately the mixture of a lactam, having more than three ring members, with a catalyst and the mixture of said lactams with an activator, heating said two mixtures to the reaction temperature immediately before or when combining them, combining and intimately mixing said two mixtures in a mixing chamber and polymerizing and foaming the combined mixtures in a mould, said catalyst being an alkali metal borohydride or an alkaline earth metal borohydride, said activator being a mono- or polyisocyanate or a masked isocyanate, said reaction temperature being at from 130 to 270° C.

Preferably the mixture of the lactam with the catalyst being kept at a temperature just above the melting point of the lactam and bringing said combined mixtures to reaction temperature by heat exchange of the lactam/activator mixture, kept at a temperature above the reaction temperature, with the lactam/catalyst mixture in said mixing chamber.

The accompanying figure shows diagrammatically an arrangement for carrying out the process. A mixture of catalyst and lactam in container 1 and a mixture of lactam and activator in container 2 are fed into a mixing chamber 7 by means of pumps 3 and 4 via heat exchangers 5 and 6. The mixture of all components prepared in mixing chamber 7 is introduced into a mould 9 through a pipe 8. Oil heated heat exchangers may be arranged in the region between pumps and mixing head. Instead of introducing the mixtures into the mixing chamber by means of pumps, they may be forced in, for example, by means of gas pressure.

This method of operation is especially suitable where alkali metal borohydrides or alkaline earth metal borohydrides are used as catalysts. These catalysts dissolve in lactam melts at elevated temperatures, liberating gas in the process, and polymerise the lactam. As shown in the following table, the rate of evolution of gas is greatly dependent upon temperature. Surprisingly, however, borohydride can be dissolved, e.g. in caprolactam, without any evolution of gas if the melt is kept only slightly above the melting temperature of the lactam.

TABLE

[Ml. evolution of gas from a solution of 1 g. of sodium borohydride in 200 g. of caprolactam]

| Time (min). | Temperature (° C.) | | | | | |
|---|---|---|---|---|---|---|
| | 80 | 100 | 120 | 160 | 200 | 240 |
| 0.5 | 0 | 0 | 0 | 0 | 200 | 1,200 |
| 1.0 | 0 | 0 | 0 | 0 | 350 | 1,300 |
| 2.5 | 0 | 0 | 0 | 0 | 830 | [1] 1,350 |
| 3.0 | 0 | 0 | 0 | 0 | 1,000 | |
| 4.0 | 0 | 0 | 0 | 0 | 1,300 | |
| 12.0 | 0 | 0 | 20 | 300 | 1,420 | |
| 20.0 | 0 | 0 | 30 | 550 | 1,440 | |
| 25.0 | 0 | 0 | 35 | 650 | [1] 1,450 | |
| 30.0 | 0 | 0 | 40 | 700 | | |
| 60.0 | 0 | 0 | 75 | 1,130 | | |
| 90.0 | 0 | 0 | 100 | 1,200 | | |
| 120.0 | 0 | 10 | 130 | 1,250 | | |
| 180.0 | 0 | 15 | 190 | 1,290 | | |
| 300.0 | 0 | 35 | 250 | 1,295 | | |
| 360.0 | 0 | 45 | 280 | 1,295 | | |
| 480.0 | 0 | 70 | 340 | 1,300 | | |
| 600.0 | 0 | 90 | 410 | [1] 1,300 | | |
| 780.0 | 0 | 100 | 510 | | | |
| 900.0 | 0 | 110 | 600 | | | |
| 1,401.0 | 0 | 125 | 690 | | | |
| 1,260.0 | 0 | 130 | 720 | | | |
| 1,440.0 | 0 | 140 | 730 | | | |
| 1,560.0 | 0 | 150 | 755 | | | |
| 1,740.0 | 0 | 160 | 790 | | | |
| 1,860.0 | 0 | 175 | [2] 830 | | | |

[1] Gels.   [2] Cloudy.

Polymerisation does not take place even after a prolonged period of time, and the quality of the resulting foams is not impaired. The sodium borohydride lactam melt can be raised to the higher reaction temperature by leading it through a heat exchanger immediately before entering the mixing head. More simply the desired reaction temperature can be adjusted by keeping the lactam/isocyanate mixture at a sufficiently higher temperature than the desired polymerizing and foaming temperature, the desired reaction temperature being obtained on mixing the two melts in the mixing chamber.

According to the process of the invention, lactams having at least four ring members, such as caprolactam, caprylic lactam or lauric lactam may be used, alone or in mixture; basic substances such as alkali metal or alkaline earth metal salts of carboxylic acids, or borohydrides are used as catalysts. Catalysts which are especially suitable are those that dissolve in the lactam, such as sodium borohydride, and act at the same time as blowing agents. However, finely divided solid catalysts may also be used in the process according to the invention. Organic isocyanates, especially alkyl or aryl mono- or polyisocyanates such as stearyl isocyanate, phenyl isocyanate, hexamethylene diisocyanate and phenylene diisocyanate may be used as activators and blowing agents. So-called masked isocyanates which split off free isocyanate, for example, on heating, such as hexamethylene-1,6-bis-carbamidocaprolactam act in a similar way. The melts may also contain additional blowing agents such as azides or readily volatile solvents. The process is carried out at temperatures from 130 to 270° C. The preferred range of temperature is from 140 to 210° C.

The process according to the invention has numerous advantages over processes previously in use. A larger reserve of reactive melts can be kept since they are stored separately and reaction does not take place before the melts are heated to the reaction temperature and combined in the mixing head. A fully continuous operation is carried out using four tanks, two for melting purposes and two serving as storage vessels. Any number of moulds can be foamed up using this mode of operation or, if a suitable draw-off apparatus is provided, endless articles such as plates or blocks can be produced continuously. Mixing and metering of the two lactam compositions does not provide any difficulties, whereas in the previous process a small quantity of catalyst, for example, had to be homogeneously distributed or dissolved in a relatively large quantity of lactam immediately before foam formation. This caused great difficulties since foam formation sets in soon thereafter.

In addition, in the process according to the invention the mould in which foaming is taking place need no longer be stirred to achieve a foam of uniform pore structure. Quite complicated shapes can be foamed without difficulty and shaped polyamide products of uniformly fine pore structure are obtained owing to the uniform mixing in the mixing chamber.

The following examples are to further illustrate the invention without limiting it.

EXAMPLE 1

100 g. of sodium borohydride are added to 10 kg. of caprolactam in a tank 1 and melted at about 120° C. 10 kg. of caprolactam together with 1,000 ml. of hexamethylene diisocyanate-(1,6) are melted with stirring in another tank 2, also at 120° C. After about one hour, the melts are pumped by metering pumps 3 and 4 into a heated mixing chamber 7 through heated pipes. The temperature in the mixing chamber and in the supply pipes is about 140° C. The supply tube 8 is kept at 180° C. so that the melt leaves at a temperature of 160° C.

The reactive melt is now introduced into preheated moulds 9 in which polymerisation accompanied by foam formation sets in after about 60 seconds. After cooling, the mouldings can be removed. They have a uniformly fine pore structure with a pore diameter of less than 1 mm. The weight per unit volume is 0.23 g./cm.$^3$.

EXAMPLE 2

In a manner analogous to Example 1, a mixture of 9.0 kg. of caprolactam and 1.0 kg. of lauric lactam, corresponding to 10% by weight of lauric lactam, is introduced into each of the two tanks, and melted after the addition of 100 g. of sodium borohydride and 1000 ml. of hexamethylene diisocyanate-(1,6) to the respective tanks. The temperature programme and moulding process are the same as in Example 1. The induction time is also about 60 seconds. A white polyamide foam having a weight per unit volume of 0.3 g./cm.$^3$ is obtained.

EXAMPLE 3

The process is carried out in the same way as in Example 2 except that instead of 10% by weight of lauric lactam, the corresponding quantity of C-methyl caprolactam is added. At the same weight per unit volume, the resulting foam is slightly harder than the foam obtained when using lauric lactam, but is more flexible than pure polycaprolactam foam.

EXAMPLE 4

The reaction components are the same as in Example 1. The pipe between the metering pumps and mixing chamber takes the form of a heat exchanger and the temperature of the melts is increased to 180° C. Only 10 seconds after the mould has been filled, foaming begins. The weight per unit volume of the foam is 0.20 g./cm.$^3$.

EXAMPLE 5

100 g. of sodium borohydride are added to 5 kg. of caprolactam in a tank 1 and the mixture is heated to about 80° C. 15 kg. of caprolactam and 1000 ml. of hexamethylene diisocyanate-(1,6) are maintained at 160° C. in another tank 2. The melts are delivered by metering pumps 3 and 4 through heat exchangers 5 and 6, the isocyanate lactam melt reaching a temperature of 230° C. The borohydride lactam melt is combined without further heating with the isocyanate lactam melt in a mixing chamber 7. The mixture is immediately transferred to preheated moulds 9 in which polymerisation sets in after a few seconds with foam formation.

What we claim is:
1. A process for the continuous production of polyamide foams which comprises the steps of
   (A) melting separately
   　(1) a mixture of a lactam having more than three ring members and an alkali metal borohydride or alkaline earth metal borohydride catalyst; and
   　(2) a mixture of a lactam having more than three ring members, and a monoisocyanate, polyisocyanate, or masked isocyanate;
   (B) combining and intimately mixing said mixtures (1) and (2) in a mixing chamber; and
   (C) polymerizing and foaming the combined mixtures in a mold;
wherein said mixture (1) is kept at a temperature just above the melting point of said lactam and said mixture (2) is kept at a temperature above the reaction temperature of 130°–270° C. such that said reaction temperature is attained by heat exchange when mixing step B is accomplished.

2. The process of claim 1 wherein the temperature of said mixture (1), prior to mixing step B, is 80°–100° C.

3. The process of claim 2 wherein the lactam is caprolactam.

4. The process of claim 3 wherein the temperature of said mixture (1) prior to said mixing step B is about 80° C.

References Cited

UNITED STATES PATENTS

| | | | |
|---|---|---|---|
| 3,017,392 | 1/1962 | Butler et al. | 260—78L |
| 3,028,369 | 4/1962 | Butler et al. | 260—78L |
| 3,084,127 | 4/1963 | Vakousky | 260—2.5 |
| 3,200,095 | 8/1965 | Wichterle et al. | 260—78L |
| 3,239,490 | 3/1965 | Gee et al. | 260—78L |
| 3,372,137 | 3/1968 | Tierney | 260—78L |
| 3,382,195 | 5/1968 | Gilch et al. | 260—2.5N |

MURRAY TILLMAN, Primary Examiner

M. FOELAK, Assistant Examiner

U.S. Cl. X.R.

260—78